April 16, 1957   C. A. E. OLDHAM   2,788,993
HOSE COUPLING WITH PART SPHERICAL JOINING RING
Filed March 9, 1953   2 Sheets-Sheet 1
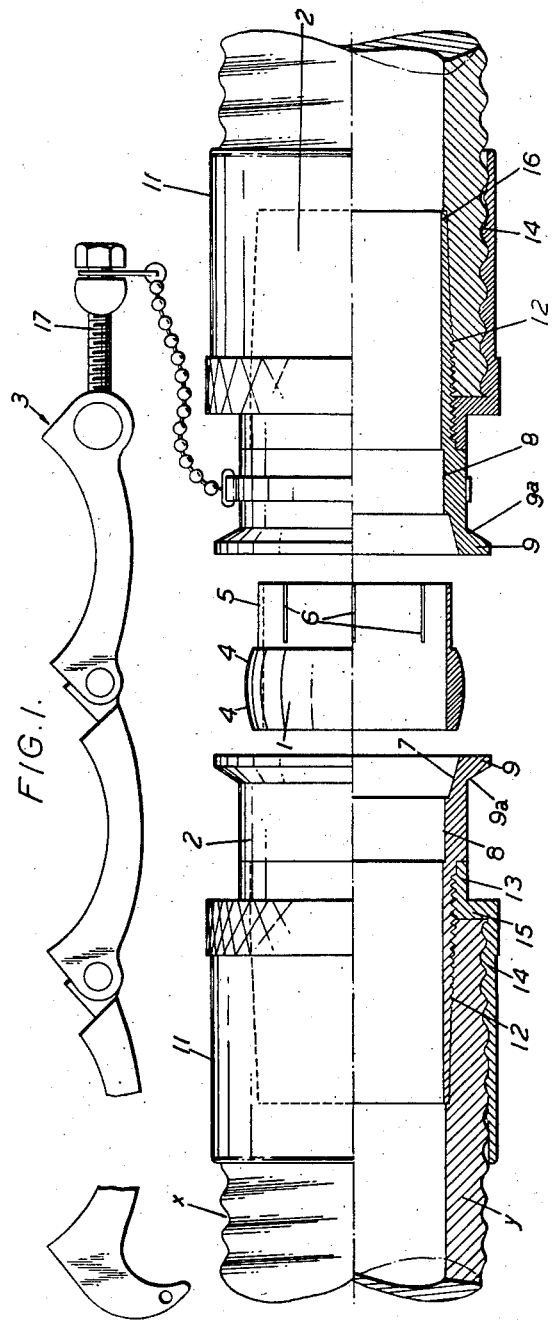
Inventor
CHARLES A. E. OLDHAM
By
Attorney April 16, 1957  C. A. E. OLDHAM  2,788,993
HOSE COUPLING WITH PART SPHERICAL JOINING RING
Filed March 9, 1953  2 Sheets-Sheet 2
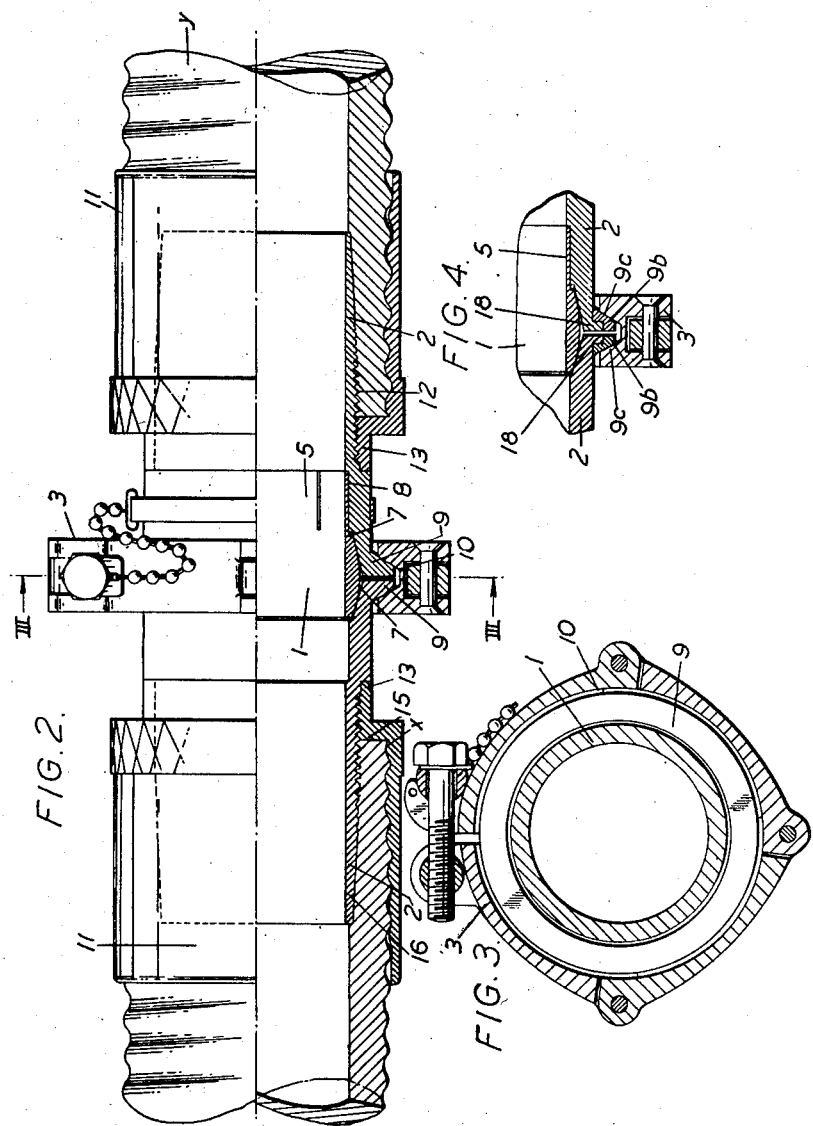
Inventor
CHARLES A. E. OLDHAM
By
Attorney ns # United States Patent Office 2,788,993
Patented Apr. 16, 1957

2,788,993

HOSE COUPLING WITH PART SPHERICAL JOINING RING

Charles Albert Edward Oldham, Clapham, London, England

Application March 9, 1953, Serial No. 341,000

Claims priority, application Great Britain October 27, 1952

4 Claims. (Cl. 285—174)

The present invention has reference to improvements in and relating to pipe joints of the kind comprising a jointing ring adapted to be located in joint "halves" in the ends of the pipes to be joined.

One object of the present invention is the provision of a pipe joint which can be applied to the pipes quickly by unskilled labour without fear of the joint being leaky even if there is some slight disalignment between the parts comprising same at the time the said parts are joined.

A further object of the invention is the provision of a pipe joint which retains its fluid tight property even if the said parts become slightly disaligned during use.

A further object of the invention is the provision of a pipe joint comprising identical "halves" so that again assembly by unskilled labour is assisted and production and stocking is simplified.

According to the invention there is provided a pipe joint comprising a jointing ring having part-spherical ends, two hollow spigots located at the ends of the ring, said spigots being adapted to enter and to be secured to the pipe ends to be joined and having flared or conical mouths adapted to receive and to contact with the part-spherical ends of the jointing ring, a flange around each spigot which flanges lie opposite each other when the ring is in the mouths of the spigots and each of which is chamfered at the side furthest from the opposite flange, and clamping means adapted to apply constricting pressure to said chamfered sides of the flanges thereby to urge the flared or conical mouths of the spigots into close engagement with the part-spherical ends of the jointing ring.

Also according to the invention there is provided a pipe joint comprising two identical hollow spigots, each spigot having a flared or conical mouth at one end and an external flange which is chamfered at the side furthest from the larger end of the said mouth, a jointing ring having part spherical ends lying within said mouths in contact with the surfaces thereof, and clamping means adapted to apply constricting pressure to said chamfered sides of the flanges thereby to urge the flared or conical mouths of the spigots into close engagement with the part-spherical ends of the jointing ring.

The jointing ring is preferably of metal so as to be unadversely affected by extremes of atmospheric temperatures.

The invention will now be described with reference to the accompanying drawings wherein:

Fig. 1 is a side elevation partly in vertical section of the parts comprising the joint in the pre-joining or "joint broken" condition, identical spigot and ferrule elements being attached to hose ends;

Fig. 2 is a side elevation partly in section of the joint "made" from the integers illustrated in Fig. 1;

Fig. 3 is a sectional elevation on the line III—III, Fig. 2; and

Fig. 4 is a fragmentary view of a modification wherein the integral flanges shown in the previous figures are replaced by separate flanges.

In the drawings the jointing ring is indicated by 1, the spigots by 2, said spigots being identical, and the clamping means by 3.

The ends of the ring 1 are part spherical at 4 and one end of the ring has a locating and retaining sleeve 5 which is split by a number of saw cuts 6 to give the sleeve some degree of flexibility and to enable it to be made an easy press fit in either socket.

The spigots which are hollow are each provided with a flared or conical mouth 7 adapted to receive and to engage a part-spherical end of the jointing ring as shown in Fig. 2, the sleeve 5 entering a shallow counterbore 8 in one of the spigots so as to locate the ring and retain it during assembly of the parts. Around the mouth of each spigot 2, Figs. 1, 2 and 3, is an integral flange 9 which is chamfered at 9a at the side furthest from the larger diameter of the mouth.

The clamping means comprises a segmental ring of a form generally known, the inner periphery of the ring, however, being grooved at 10 to make contact with the chamfered sides of the flanges when the parts are assembled as shown in Fig. 2.

The joint also comprises ferrules 11 which assist in securing the pipe ends to be joined together to the spigots. For this purpose the spigots are externally screw threaded at 12 and the ferrules have reduced ends 13 which are screw threaded for engagement with the threads 12; and the ferrules have internal helical ribs 14 which are complementary to helical grooxes $x$ in the pipe ends—in this case hose ends.

The joint is applied to the hose ends as follows:

The ferrules 11 are applied to the ends of the hose by screwing them thereon, the ribs 14 acting as screw threads in the helical grooves $x$, until the extremities of the hose $y$ butt against the shoulders 15 joining the reduced parts of the ferrules to the larger parts thereof. The spigots 2 are then screwed into the respective ferrules 11, the leading ends of the spigots being tapered at 16 to facilitate their entry into the hose, with the result that the material of the hose besides being held to the spigots frictionally and by the helical ribs 14 on the ferrules, is held by reason of its being squeezed between the spigots 2 and those parts of the ferrules 11 surrounding the spigots, the external diameter of the spigots being greater than the diameter of the hose bore.

After the spigots have been secured to the hose ends the jointing ring 1 is inserted in the mouth of one spigot, the other spigot and the ring are then brought together so that the ring lies partly in the mouth of each spigot, the clamping means is applied to the flanges 9 and the screw 17 of the said means is tightened. Tightening of the screw causes the ring 3 to apply constricting pressure to the flanges 9, with the result that the spigots 2 are drawn towards each other and the surfaces of their flared mouths 7 make tight engagement with the ends of the ring 1, thus ensuring a tight joint.

It will be appreciated that the joint can be broken as readily as it can be made and the parts are reusable.

The spherical ended ring 1 permits of some relative disalignment of the spigots 2 without danger of the joint being leaky as a result of this disalignment; and the ring 1 has a limited amount of tilting movement with the spigots having regard to the fact that the sleeve 5 is flexible.

All parts of the joint may be made of metal and as a result extremes of atmospheric temperature do not cause the joint to become leaky in use. If desired the ring 1 may be of harder metal than that from which the spigots are made.

In Fig. 4 the modification in comparison with the joint shown in Figs. 1, 2 and 3 resides in the provision of separate flanges 9b having chamfered sides 9c, said flanges being adapted to butt against ribs 18 on the adjacent ends of the spigots 2.

What I claim is:

1. A pipe joint comprising opposed tubular metal parts each having an enlarged conical mouth, an inner cylindrical surface adjacent the inner end of the conical mouth and an outwardly directed terminal flange, each said flange having an end face and a chamfered annular face on the side remote from the end face, said flange surrounding the conical mouth and conferring rigidity thereto, a part-spherical jointing metal ring located within the opposed conical mouth portions, a cylindrical sleeve extending from one end of said jointing ring and provided with axially extending slots to give flexibility to the sleeve, said sleeve engaging the inner cylindrical surface of a tubular part to serve as locating and retaining means for the jointed ring in relation to one of said tubular parts, the spherical surface of said metal ring making direct peripheral line contact with each of the conical surfaces of said conical mouth portions, the angle of said conical mouths relative to the axis of said tubular parts being relatively small to make surrounding engagement with the spherical surface of said ring, the angle of said chamfered face to the axis of the tubular parts being much greater than the angle of the conical mouth, a sectional clamping ring embracing the opposed flanges and having inner bearing faces engageable with the chamfered faces of the flanges to exert an axial force on said flanges forcing the mouth portions into intimate sealing contact with the jointing ring and effecting inward radial compression thereon to produce metal-to-metal contact between the opposed tubular parts and the jointing ring.

2. The pipe joint according to claim 1 wherein said sectional clamping means include a segmental clamping element having a screw for contracting it by exerting a pull on the adjacent ends of two of the sections of the clamping means.

3. A pipe joint for hose as set forth in claim 1 wherein each tubular metal part is provided with an externally threaded tapered spigot, and an internally threaded ferrule for clampingly holding the end of the hose between the tapered spigot and the ferrule.

4. A pipe joint as set forth in claim 1 wherein the inner cylindrical surface comprises a recess which is identical in both the opposed tubular metal parts, so that the slotted cylindrical sleeve of the jointing ring may engage either one of said recesses.

References Cited in the file of this patent

UNITED STATES PATENTS

| | | |
|---|---|---|
| 720,655 | Bard | Feb. 17, 1903 |
| 880,813 | Nailler | Mar. 3, 1908 |
| 964,579 | Stephens | July 19, 1910 |
| 1,025,759 | McCluskey | May 7, 1912 |
| 1,093,868 | Leighty | Apr. 21, 1914 |
| 1,782,484 | Spencer | Nov. 25, 1930 |
| 1,794,905 | Kass | Mar. 3, 1931 |
| 1,866,636 | Fantz | Nov. 5, 1932 |
| 1,985,544 | Muchnic | Dec. 25, 1934 |
| 2,020,156 | Muchnic | Nov. 5, 1935 |
| 2,112,352 | Vetrano | Mar. 29, 1938 |
| 2,340,732 | Bruno | Feb. 1, 1944 |
| 2,551,536 | Harvey | May 1, 1951 |

FOREIGN PATENTS

| | | |
|---|---|---|
| 130,167 | France | Apr. 16, 1879 |
| 119,317 | Australia | Dec. 21, 1944 |